United States Patent [19]

Marlowe

[11] Patent Number: 4,672,810

[45] Date of Patent: Jun. 16, 1987

[54] HYDRAULIC TRANSMISSION DEVICE AND METHOD OF USING IT

[76] Inventor: Christian P. Marlowe, 6491 Magnolia Ave., Nederland, Colo. 80466

[21] Appl. No.: 787,251

[22] Filed: Oct. 15, 1985

[51] Int. Cl.$^4$ ............................................. F16D 33/02
[52] U.S. Cl. ....................................... 60/332; 60/489; 60/493
[58] Field of Search ................. 60/332, 333, 489, 490, 60/493, 487

[56] References Cited

U.S. PATENT DOCUMENTS

| | | | |
|---|---|---|---|
| 2,389,174 | 11/1945 | Whitworth | 60/332 |
| 2,400,622 | 5/1946 | Althoff | 60/332 |
| 2,501,771 | 3/1950 | Gray | 60/332 |
| 3,805,526 | 4/1974 | Charron | 60/493 |
| 4,581,896 | 4/1986 | Andresen et al. | 60/489 |

Primary Examiner—James C. Yeung
Attorney, Agent, or Firm—Victor E. Libert

[57] ABSTRACT

A fluid-operated transmission device has an impeller mounted within an input chamber which is driven by a motor or other motive source. A variable-speed rotor is positioned within an output chamber, the volume of which is selectively adjustable by positioning of a baffle means so that the volume of the output chamber which forms part of the fluid flow circuit may be selectively adjusted, thereby adjusting the speed of hydraulic fluid passing through the output chamber, and thereby the speed of the output rotor at constant output power. Fluid flow direction means are provided which enable braking and/or reversing direction of rotation of the variable-speed rotor by changing the direction of flow of the fluid impinging onto the impingement surface thereof.

23 Claims, 15 Drawing Figures

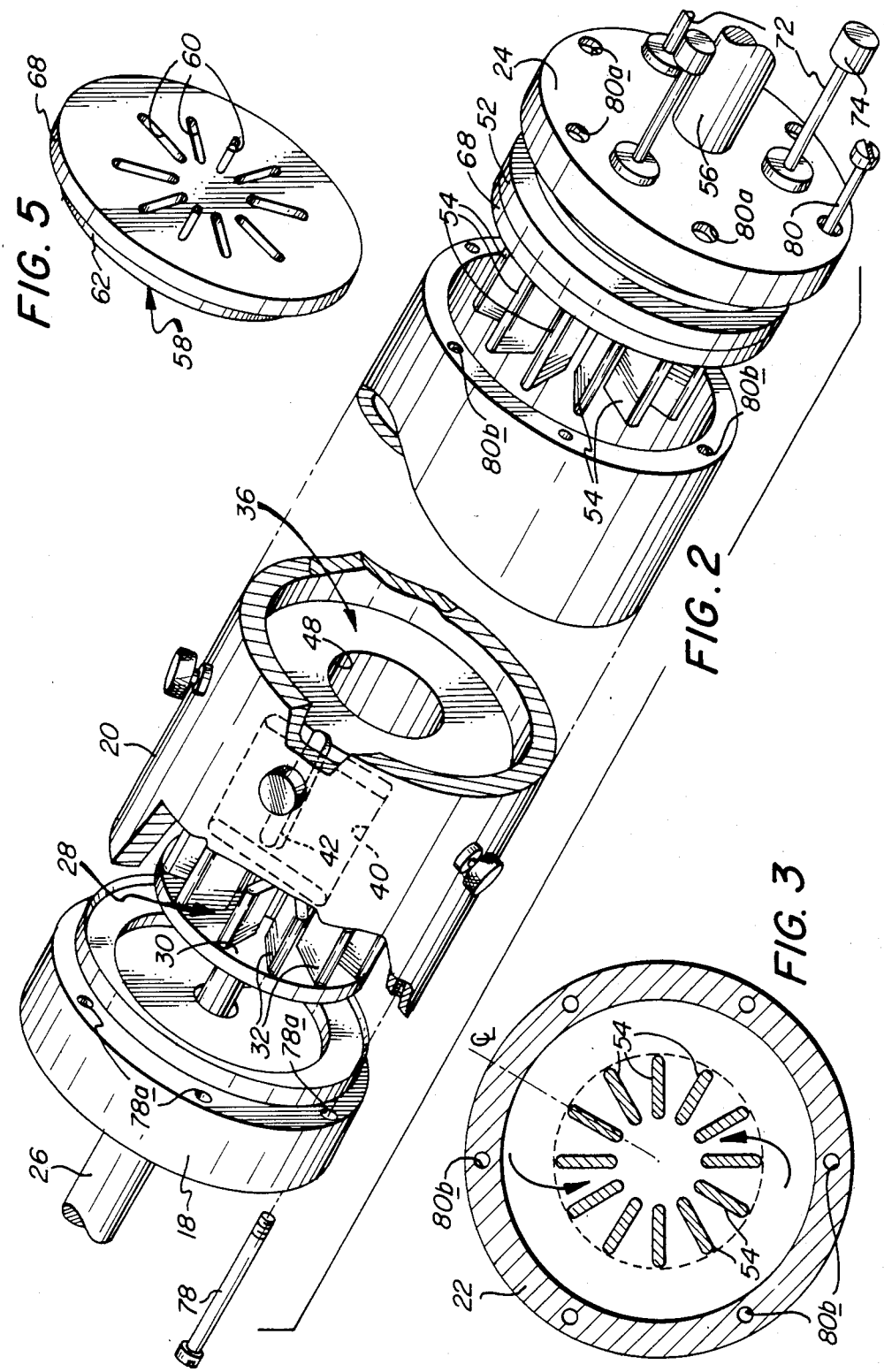

HYDRAULIC TRANSMISSION DEVICE AND METHOD OF USING IT

BACKGROUND OF THE INVENTION

The present invention is concerned with a hydraulic transmission device and in particular with a hydrodynamic adjustable-speed fluid transmission.

Various types of torque converters, hydraulic couplings and fluid transmission devices of the type which employ an impeller or pump driven by a power source to circulate a transmission fluid to an output turbine which drives an output shaft or the like are, of course, known in the art. The following U.S. Patents describe typical prior art expedients.

Stump et al U.S.Pat. No. 2,929,214 shows a hydrodynamic torque converter and brake in which an impeller is mounted on a driving shaft 13 and a turbine 11 is mounted on a driven shaft 14. In operation, the driving shaft 13 causes the impeller 10 to act as a pump which circulates the liquid within the housing and transmits energy via turbine 11 to driven shaft 14. As disclosed in the paragraph bridging columns 2 and 3 of the patent, the position of vaned portions 19 of the vanes 15 may be adjusted about studs 20 t produce the desired braking couple between the elements.

Kelley U.S. Pat. No. 2,999,569 discloses a hydrodynamic torque converter which comprises a pump P, a first turbine Tl, a second turbine T2, and a stator or reaction member R. As described beginning at line 46 of column 3, rotation of a fly wheel 12 drives pump P which circulates liquid to rotate turbine T1 and thereby drive turbine T2 through a planetary gear system. Beginning at line 50 of column 4, under the heading "Controllable Stator", means to permit a change in the stator blade orientation between the low angle and high angle positions is described. See also the paragraph in column 7 under the heading "Stator Blade Contour".

Walker et al U.S. Pat. No. 3,466,869 discloses a hydrodynamic torque converter comprising a pump and turbines comprising first blades 13 and second blades 15 with bladed stator elements disposed in the fluid flow path. The second stator has blades 51 mounted on pins 43 and disposed between the second turbine blades 15 and the pump 7. Starting at column 3, line 52 there is described pivoting movement of stator blades 51 between high and low angular positions relative to the center line of the converter.

Wirz U.S. Pat. No. 2,670,602 discloses a rotary turbine type hydraulic coupling in which a driving shaft 7 carries an impeller 8 and a driven shaft 15 is splined to a sleeve 16 which carries a rotor 18. As described at column 3, lines 20-30, as the torque transmitted to shaft 15 increases, rotor 18 travels on sleeve 16 backing away and thereby decoupling from the impeller 8. A funnel-like fluid collector 28 collects liquid discharged through openings 13 and reintroduces it into an impeller chamber through annular openings 14.

Lewis U.S. Pat. No. 2,718,944 discloses a rotary hydraulic coupling comprising a drive impeller and a driven turbine member having an interfitting vane construction comprising members which are movable relative to each other thereby to effectuate selectively a forward and reverse drive. As described in the paragraphs bridging columns 2 and 3 of the patent, movement of turbine 16 outwardly reverses the flow with respect to vanes 27 and 28 in order to accomplish reverse drive.

SUMMARY OF THE INVENTION

In accordance with the present invention there is provided a fluid-operated transmission device comprising: a housing enclosing an input chamber and an output chamber having an adjustable baffle means mounted therein, the input chamber and the unbaffled portion of the output chamber being interconnected in fluid flow communication by a fluid discharge passage and a fluid return passage to define a fluid flow circuit, the adjustable baffle means being movably mounted within the output chamber to selectively adjust the volume of the output chamber portion of the fluid flow circuit; an impeller mounted for rotation within the input chamber and having input connector means dimensioned and configured for connection to a driving means for rotation of the impeller by the driving means to pump fluid through the discharge passage; and a variable-speed rotor mounted on the housing for rotation within the output chamber by fluid discharged from the output passage and having output connector means dimensioned and configured for connection to a driven means for driving thereof by the rotor, the rotor comprising a rotor impingement surface disposed in the output chamber portion of the fluid flow circuit, whereby adjustment of the volume of the output chamber portion of the fluid flow circuit adjusts the rotational speed of the rotor.

In one aspect of the invention, the adjustable baffle means is movable relative to the rotor impingement surface whereby to expose a selected portion thereof to the output chamber portion of the fluid flow circuit. In one embodiment of this aspect of the invention, the rotor impingement surface comprises a plurality of rotor blades and the adjustable baffle means comprises a baffle wall having one or more openings therein dimensioned and configured to receive respective rotor blades therein for sliding movement relative thereto.

In yet another aspect of the invention, the device further includes a flow controller disposed within the housing between the input chamber and the output chamber, the flow controller comprising a fluid discharge passage having flow-directing means operatively associated therewith to control the direction of impingement of fluid discharged from the discharge passage onto the rotor impingement surface. The flow-directing means may be mounted for selective positioning whereby to selectively direct the angle of impingement of fluid onto the rotor impingement surface.

Other aspects of the invention provide for a fluid-operated transmission device which further includes positioning means operatively associated with the adjustable baffle means to selectively position the latter within the output chamber. The positioning means, in one embodiment, may comprise one or more positioning rods extending through the housing and having rod control means which are accessible from exteriorly of the housing.

In another embodiment, the positioning means may comprise a positioning collar operatively connected to the adjustable baffle means and mounted, preferably rotatably mounted, within the housing, and further includes collar drive means, e.g., a stepping motor, operatively connected to the positioning collar to rotate the positioning collar to a selected rotational position corresponding to a desired position of the adjustable baffle means.

Yet another aspect of the invention provides a device wherein the flow controller is of generally cylindrical configuration, the fluid discharge passage is disposed adjacent the outer circumference of the flow controller, the fluid return passage is disposed radially inwardly thereof and the impeller and rotor are mounted at respective longitudinally opposite ends of the flow controller. The fluid discharge passage may comprise one or a plurality of fluid discharge passages and the flow-directing means may comprise a plurality of adjustable means, respective ones of which are mounted within respective fluid discharge passages.

In yet another aspect of the invention, at least one flow directing means is adjustable between a first drive position in which fluid is directed onto the rotor impingement surface of the variable-speed rotor to drive the rotor in a first direction, and a second drive position in which the fluid is directed onto the rotor impingement surface of the variable-speed rotor to drive it in a direction opposite to the first direction.

In yet another aspect of the invention, the flow directing means is movable between a drive position in which fluid is directed onto the rotor impingement surface of the variable-speed rotor in a direction to drive the rotor, and a braking position in which fluid is directed onto the rotor impingement surface in a direction to resist rotation thereof.

In accordance with another aspect of the invention, there is provided a method of transmitting power at selected output speeds by means of any of the devices as described above comprising the steps of transmitting power from a motive source to the impeller to rotate the latter to pump fluid through the fluid flow circuit; and selectively adjusting the volume of the output chamber whereby the speed of movement of the pumped fluid through the output chamber, and thereby the rotational speed of the rotor, is selectively adjusted.

In another aspect of the method of the invention, there is included the further step of controlling the angle of impingement of fluid discharged from the fluid discharge passage onto the impingement surface of the rotor. For example, the method may include changing the angle of impingement of fluid discharged from the fluid discharge passage onto the impingement surface of the rotor whereby to reverse the direction of rotation of the rotor. Further, the method may include changing the angle of impingement of fluid discharged from the fluid discharge passage onto the impingement surface of the rotor whereby to brake the rotor by offering resistance to the rotation thereof.

Other aspects of the invention will be apparent from the following description.

BRIEF DESCRIPTION OF THE DRAWINGS

FIG. 2 is a perspective, exploded view of the embodiment of FIG. 1;

FIG. 3 is a section view taken along line 3—3 of FIG. 1;

FIG. 5 is a perspective view of the adjustable baffle means of the embodiment of FIG. 1;

DETAILED DESCRIPTION OF THE PREFERRED EMBODIMENTS

Figure 1:
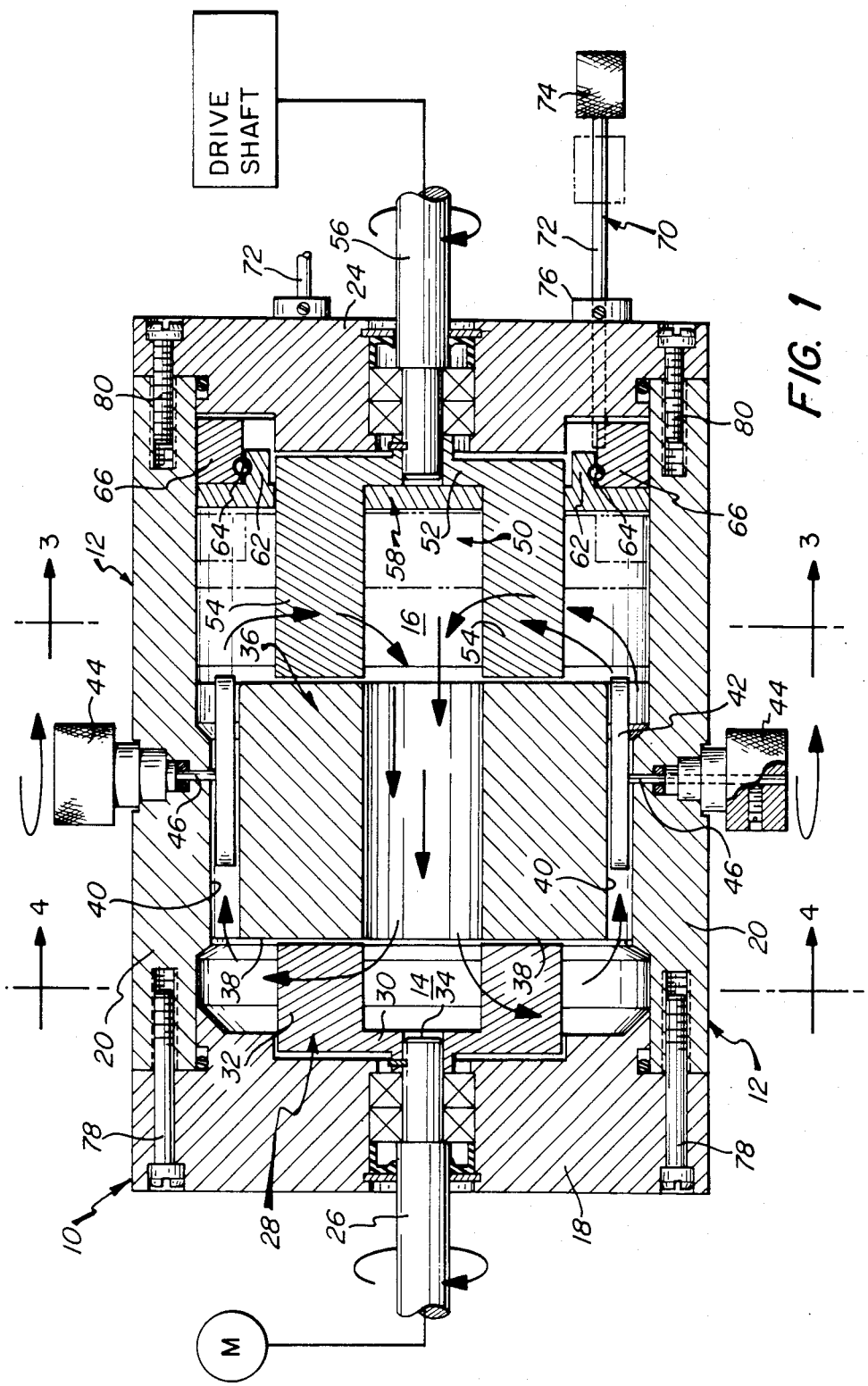
FIG. 1 is a section view in elevation of one embodiment of the invention.
Figure 6:
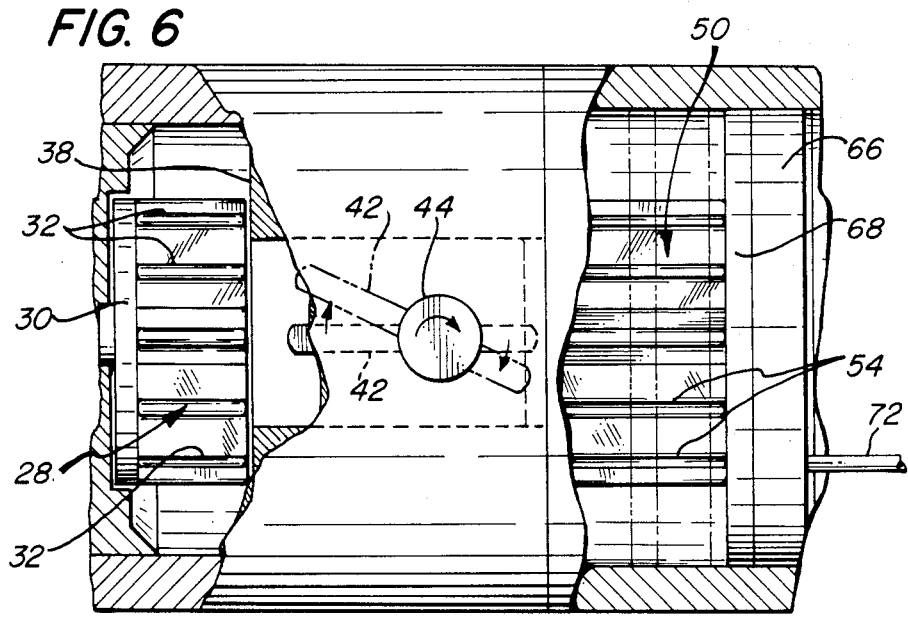
FIG. 6 is a partial top view, with parts broken away of the embodiment of FIG. 1.

Referring now to FIG. 1, a fluid-operated transmission device comprising one embodiment of the present invention is generally indicated at 10 and comprises a housing 12 enclosing an input chamber 14 and an output chamber 16. Chambers 14, 16 are of generally cylindrical configuration and are defined by the configuration of interior surfaces of the components of housing 12 and a flow controller 36. Housing 12 comprises an input end plate 18, a central housing 20 and an output end plate 24. In the illustrated embodiment, central housing 20 is integral with flow controller 36, as described below in greater detail. Input end plate 18 is of generally disc-shaped configuration and has a central bore (unnumbered) therein within which a driving shaft 26 is mounted for rotation on bearings (unnumbered). An impeller 28 is keyed or otherwise mounted upon driving shaft 26 for rotation therewith and is disposed within input chamber 14. Driving shaft 26 is dimensioned and configured to be connected to a motor or other suitable means for rotation of impeller 28, as described below. As best seen in FIGS. 2 and 6, impeller 28 comprises a hub 30 of generally disc-shaped configuration, having a plurality of impeller blades 32 extending at right angles outwardly from the inner face of hub 30. In the embodiment illustrated in FIGS. 1-6, impeller blades 32 are of generally rectangular configuration in side profile view and have rounded longitudinal ends as best seen in FIGS. 2 and 6. A central bore 34 (FIG. 1) is provided in hub 30 for receiving therein a mounting portion (unnumbered) of driving shaft 26.

Figure 4:
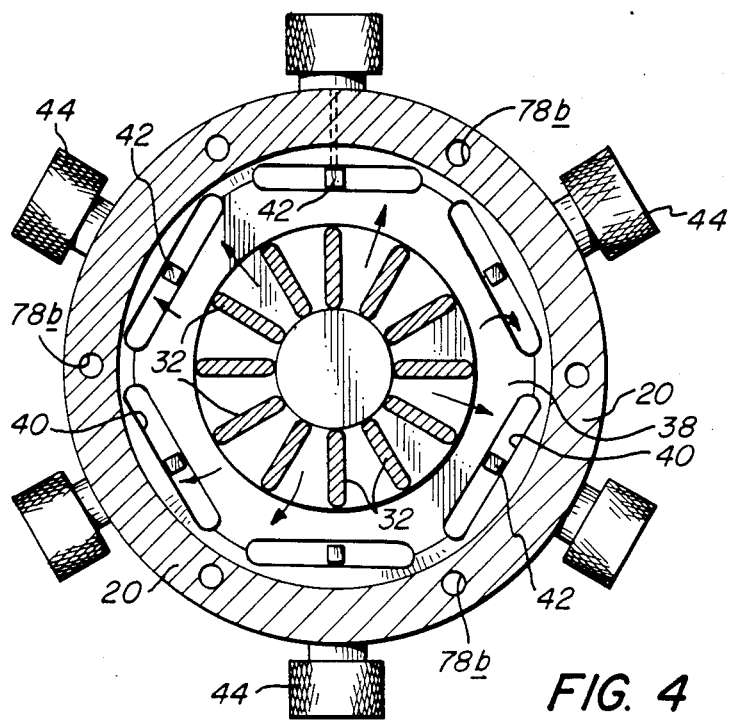
FIG. 4 is a section view taken along line 4—4 of FIG. 1.

As best seen by referring to FIGS. 1 and 2, flow controller 36 is of a generally cylindrical configuration and is integrally formed as a single piece with central housing 20 which is of annular configuration in end view as shown in FIG. 4. The input-side face 38 of flow controller 36 is seen to be recessed (FIG. 1) relative to the input-side end of central housing 20 so as to cooperate with the interior surfaces of input-side end of central housing 20 and of input end plate 18 to define input chamber 14 therebetween. As best seen in FIGS. 1 and 2, a fluid discharge passage is defined by a plurality of fluid discharge passages 40 which extend longitudinally through flow controller 36, each passage 40 being of a relatively wide and shallow slot-like configuration and having opposite, planar long sides (in end view) connected by relatively short, curved short sides. As best seen in FIG. 1, there is mounted within each of fluid discharge passages 40 a flow directing means comprising, in the illustrated embodiment, axial guide vanes 42, each of which is mounted for pivoting movement within its respective fluid discharge passage 40. Vane adjustment means comprising control knobs 44 are connected by means of respective vane control shafts 46 to axial guide vanes 42 for positioning and locking of the latter in a selected angular position relative to the longitudinal axis of each respective fluid discharge passage 40. As best seen in FIG. 1, axial guide vanes 42 generally bear on respective opposite surfaces of its associated discharge passage 40 so that vane 42 will serve to direct the direction of flow of liquid discharged from its associated discharge passage 40.

A fluid return passage 48 comprises, in the illustrated embodiment, a cylindrical passage centered on the longitudinal axis of flow controller 36. As may best be appreciated from FIG. 1, a fluid flow circuit is defined, as indicated by the unnumbered arrows in FIG. 1, as comprising input chamber 14, fluid discharge passages 40, output chamber 16 and fluid return passage 48, the fluid flowing through the components in the order stated.

Figure 3A:
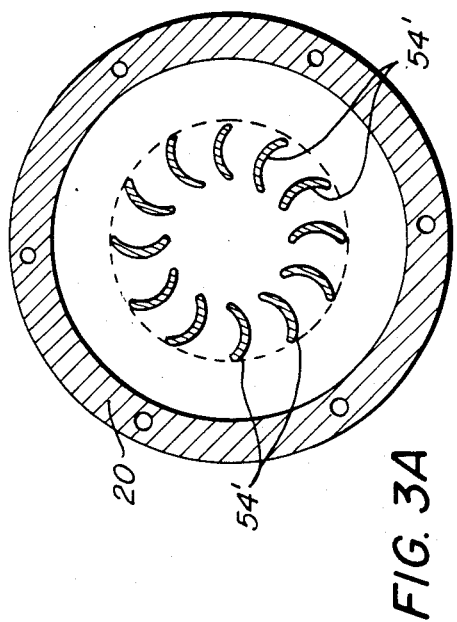
FIG. 3A is a view corresponding to FIG. 3 but of an alternate embodiment of the invention.

A variable speed rotor 50 is mounted for rotation within output chamber 16 by being keyed or otherwise mounted upon driven shaft 56 so that the latter is compelled to rotate with rotor 50. Driven shaft 56 is dimensioned and configured to be connected to a drive shaft or other suitable means for driving of the latter by rotor 50, as described below. As best seen in FIGS. 1, 2 and 6, rotor 50 comprises a hub 52 of generally disc-shaped configuration, having a plurality of rotor blades 54 extending at right angles outwardly from the inner face of hub 52. Rotor blades 54 are similar in configuration to impeller blades 32 and of substantially the same width although they are more than twice as long, about 2.2 times longer in the embodiment illustrated. Thus, rotor blades 54 in the illustrated embodiment are of generally rectangular configuration in side profile view and have rounded longitudinal ends, as best seen in FIGS. 2 and 3. Of course, the length and other dimensions of the rotor blades may vary as needed to satisfy specific transmission criteria. Generally, the impeller blades 32 and rotor blades 54 may have any suitable size and any suitable shape as required in a given case. For example, one or both of the impeller and rotor blades may be configured to have curved profiles as schematically illustrated in FIG. 3A with respect to an alternate embodiment of rotor blades, shown as rotor blades 54'. Rotor blades 54' could also be curved in the direction opposite to that shown in FIG. 3A. In a given case, the impeller and rotor blades may be configured identically or differently.

An adjustable baffle means 58 (FIGS. 1 and 5) has a plurality of openings 60 extending longitudinally therethrough and arranged in a spoke-like radial pattern about the longitudinal center line thereof. A circular collar 62 is formed on the outer face of baffle means 58 and has recesses (unnumbered) formed therein within each of which a steel ball bearing 64 is received which bears in sliding relationship adjacent a baffle bearing ring 66 which is mounted at the output end of output chamber 16, as best seen in FIGS. 1 and 2. Adjustable baffle means 58 has an outer rim 68 (FIG. 5) which is dimensioned and configured to clear the portion of output chamber 16 defined by the inner surface of central housing 20. Outer rim 68 does not form a fluid tight seal against the inner surface of central housing 20 but is dimensioned and configured relative thereto to permit fluid leakage around adjustable baffle member 58 as the latter is moved leftwardly as viewed in FIG. 1 as described in more detail below. Thus, in the illustrated embodiment, the diameter of outer rim 68 of adjustable baffle means 58 is less than the inside diameter of output chamber 16 by an amount just sufficient to permit leakage sufficient to enable repositioning of baffle means 58 by moving it through output chamber 16, which is filled with fluid. There could also be some slight leakage in the space between openings 60 and rotor blades 54. Alternatively, or in addition, one or more small fluid flow passages could be provided within baffle means 58, possibly with a one-way or check valve means therein to facilitate repositioning of adjustable baffle means 58 by movement thereof through fluid-filled output chamber 16.

A positioning means 70 comprises three positioning rods 72 positioned 120° apart along the periphery of output end plate 24 as best seen in FIG. 2 (only one of rods 72 is fully shown in FIG. 1, for clarity of illustration). Positioning rods 72 extend through output end plate 24 into housing 12 and into engagement with baffle bearing ring 66 to permit selective positioning of the latter, and thereby of adjustable baffle means 58, within output chamber 16. Baffle bearing ring 66 is thus laterally slideable within output chamber 16 but is held against rotation with rotor 50 and adjustable baffle means 58 by positioning rods 72. Baffle bearing ring 66 has a groove (unnumbered) therein which faces a groove (unnumbered) in baffle means 58, the respective grooves being aligned and sized to contain therewithin ball bearings 64, which are of a diameter greater than the depth of either of the two facing grooves. By thus caging the ball bearings so that a segment thereof is contained within each of the pair of cooperating grooves, rightward movement (as viewed in FIG. 1) of baffle bearing ring 66 by positioning rods 72 carries adjustable baffle means 58 therewith. Each of positioning rods 72 has a positioning knob 74 affixed to the distal end thereof for convenient manual manipulating of the same and extends through a collar 76 affixed to the outer end of output end plate 24 and within which a set screw (unnumbered) is received to enable securing positioning rod 72 in any selected position. Thus, positioning rod 72 can be moved leftwardly or rightwardly as viewed in FIG. 1 to correspondingly move baffle bearing ring 66 and thereby adjustable baffle means 58 leftwardly or rightwardly. A more leftward position of both adjustable baffle means 58 and positioning knob 74 is indicated in dot-dash outline in FIG. 1. Obviously, any other suitable type of positioning means may be employed. For example, as described below in connection with FIGS. 9–9B, a helical ring operated by a stepping motor may be employed to advance and withdraw baffle ring 66 (and thus adjustable baffle means 58) in response to a motor control setting. This arrangement may be utilized in lieu of the manual positioning means 70 illustrated in FIGS. 1, 2 and 7.

As shown in FIGS. 1 and 2, input end plate 18 is affixed by bolts 78 to central housing 20, the bolts passing through a plurality of bores 78a in input end plate 18 (FIG. 1) and bores 78b in central housing 20 (FIG. 4). Output end plate 24 is similarly connected to central housing 20 by means of bolts 80 which pass through bores 80a in end plate 24 and bores 80b in central housing 20.

In operation, the fluid operated transmission device 10 is operatively associated with a motive means such as a motor M, schematically indicated in FIG. 1, via driving shaft 26 which is rotated by motor M thereby rotating impeller 28 within input chamber 14. The transmission device 10 is filled with a suitable fluid, such as a conventional hydraulic transmission fluid, which fills input chamber 14, output chamber 16, fluid discharge passages 40 and fluid return passage 48. Impeller 28 pumps the hydraulic fluid through the respective fluid discharge passages 40 from which the pumped fluid emerges to impinge upon the impingement surfaces provided by rotor blades 54 of variable speed rotor 50. As may best be appreciated from FIG. 6, the angle of attack of fluid discharged from the output end of fluid discharge passages 40 is controlled by the selected prepositioning of axial guide vanes 42 so that the efficiency of transmitting kinetic energy imparted by impeller 28 to rotor 50 may be selectively adjusted by the positioning of axial guide vanes 42.

Control of the rotational speed of variable speed rotor 50 is provided by selectively positioning adjustable baffle means 58, which is slidably mounted on rotor 50, in any desired position between its extreme right hand position shown in FIG. 1, an intermediate position shown in dot-dash outline in FIG. 1, or a still more leftwardly (as viewed in FIG. 1) position. Positioning of baffle means 58 is attained by merely loosening the set screw (unnumbered) received within collar 76 and manually manipulating positioning rods 72 by means of respective positioning knobs 74 thereon to locate baffle means 58 in its desired position. When the desired position is reached, which may be indicated by indicia means (not shown) provided on one or all of positioning rods 72, the set screw contained within collar 76 is tightened to hold positioning rod 72 and thereby baffle means 58 in place. As noted above, baffle means 58 may be positioned in any suitable way, manually or by a motor driven device.

Regardless of how it is positioned, as baffle means 58 is re-positioned the volume of that portion of output chamber 16 which forms part of the fluid flow circuit is selectively adjusted. For example, the more that baffle means 58 is moved towards flow controller 36 (leftwardly as viewed in FIG. 1), the more reduced is the fluid flow circuit volume portion of output chamber 16. Since the mass flow rate of fluid discharged from fluid discharge passages 40 is constant, with the effective volume of output chamber 16 reduced, fluid velocity in output chamber 16 is increased and thereby the speed of rotation of variable speed rotor 50 is increased. The output power remains substantially constant at different output rotation speeds because the mass flow rate remains substantially constant. The mass flow rate remains constant because decreases in the volume of the fluid flow circuit cause an increase in the velocity of the fluid in the fluid flow circuit, and increases in the volume of the fluid flow circuit cause a concomitant decrease in velocity. As baffle means 58 is re-positioned rightwardly, the effective volume of output chamber 16 in the fluid flow circuit is increased and the velocity of fluid therethrough is correspondingly decreased, which decreases the speed of rotation of rotor 50. Thus, the output power provided by rotor 50 is unchanged at different speeds of rotation of rotor 50.

It will be noted that movement of adjustable baffle means 58 changes the effective impingement surface provided by rotor blades 54. By "effective" impingement surface is meant the surface of rotor blades 54 which is exposed to the fluid flowing through output chamber 16. The fluid leaving output chamber 16 returns via fluid return passage 48 to input chamber 14 wherein it is pumped by impeller 28 and recirculated through fluid discharge passages 40. As will be appreciated from the drawings, particularly FIGS. 1, 2 and 3 (and FIG. 3A with respect to an alternate embodiment), the rotor blades of the variable speed rotor, e.g., blades 54 of rotor 50 of FIGS. 1 and 2, are open to radial flow across the portion thereof which is exposed within output chamber 16.

Upon re-positioning movement of adjustable baffle means 58 relative to rotor 50, fluid passes through the small clearance between central housing 20 and outer rim 68 of baffle means 58 and is stored between the inner surface (unnumbered) of output end plate 24 and the adjustable baffle means 58. Although there is sufficient annular clearance for fluid to pass behind baffle means 58 when the latter is re-positioned towards or away from flow controller 36, the small size of the leakage opening (or openings, taking into consideration openings 60) effectively isolates the fluid stored between baffle means 58 and output end plate 24 and keeps the stored fluid out of the fluid flow circuit driven by impeller 28. The stored fluid merely travels with the rotation of rotor 50 imposing only a minor and practically negligible drag effect. Driven shaft 56 is operatively associated with a drive shaft, schematically indicated in FIG. 1, or other means which are intended to receive the transmitted output of motor M.

Some items shown in FIG. 1, such as end plate O-ring seals and knob set screws, have not been numbered or described since their structure and use will be apparent to those skilled in the art.

Figures 8A, 8B:
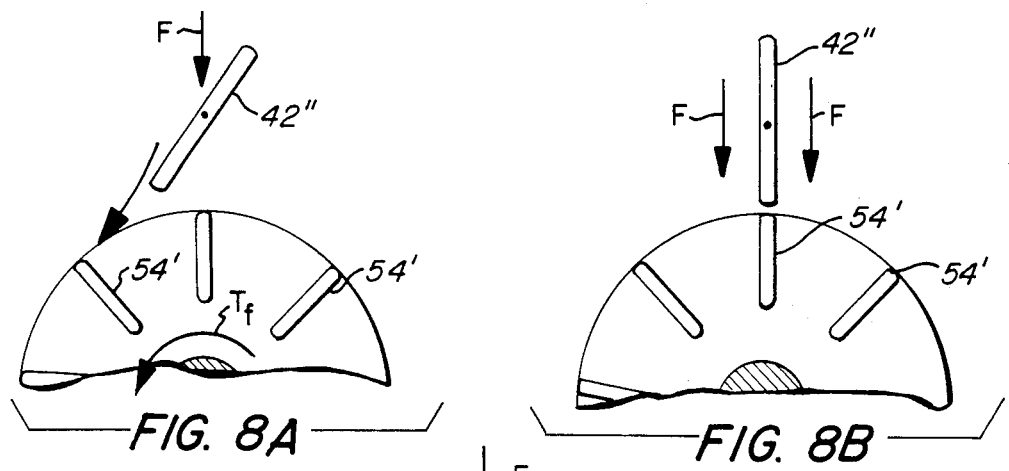
FIGS. 8A, 8B and 8C are schematic views respectively illustrating three different settings of flow directing means of the invention.
Figure 8C:
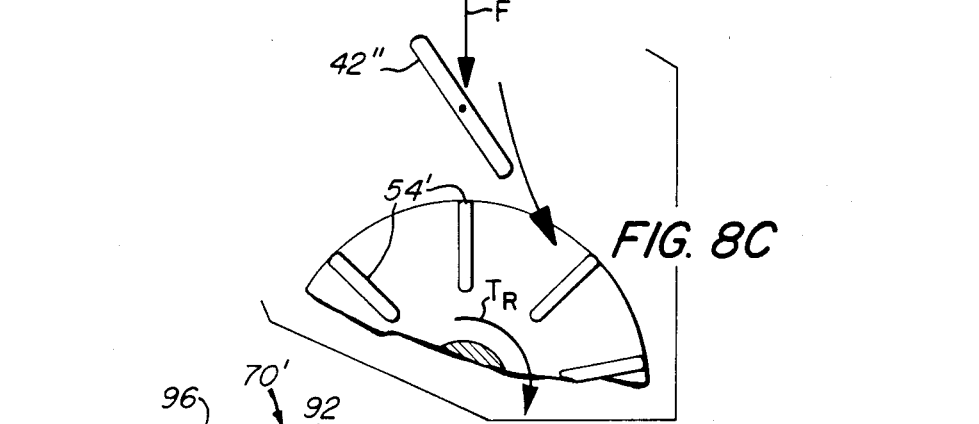

The disclosed structure can also be utilized to brake the output shaft and to reverse the direction of rotation of the output shaft by appropriately re-positioning axial guide vanes 42. The braking capability provides better control of the output of the device and the reversing capability permits the elimination of reverse gearing or the necessity of reversing the direction of the motor M, which are common prior art expedients to reverse the direction of rotation of the output shaft. Accordingly, the device, in preferred embodiments thereof, provides an adjustable speed, brakeable and reversable fluid transmission device. For example, by merely appropriately positioning the axial guide vanes 42, the direction of the fluid impinging upon rotor blades 54 of hub 50 can be selectively changed among forward, reverse and braking modes. By simply reversing the position of axial guide vanes 42 from, say, clockwise to counterclockwise flow within output chamber 16 while the device is in operation, the direction of fluid flow is changed to counter the direction of rotation of driven shaft 56, thus dynamically braking the shaft. An intermediate position of axial guide vanes 42, between the forward driving position and the reverse or dynamic braking position may serve to provide braking of the turbine. For example, referring now to FIG. 8A, there is schematically illustrated an axial guide vane 42" positioned to direct the flow of fluid indicated by the arrows F onto the rotor blades 54' with a tangential vector so as to drive the turbine in the forward direction of rotation indicated by the arrow $T_f$. If, with the turbine in operation, it is desired to brake the turbine and thereby driven shaft 56, axial guide vane 42" may be moved to the position shown in FIG. 8B, in which the direction of fluid flow is parallel to the surfaces of rotor blades 54, thereby eliminating a tangential component of fluid flow relative to the blades. If the turbine is rotating when axial guide vanes 42a are turned to the parallel direction indicated in FIG. 8B, the resistance of the liquid to shear by the blades will impart a braking action to the turbine. More dynamic braking amy be obtained by moving axial guide vanes 42" to the position shown in FIG. 8C, in which guide vanes 42" are seen to be turned in a direction to reverse the tangential component of flow onto rotor blades 54 from that shown in FIG. 8A. If the turbine is rotating in the direction by the arrow $T_f$ (FIG. 8A) when axial guide vanes 42 are turned to the relative position shown in FIG. 8C, the fluid will be directed tangentially opposite to the direction of rotation and exert a powerful dynamic braking action on the rotor blades 54. If rotation by motor M of the driving shaft 26 is continued with the axial guide vanes in the position shown in FIG. 8C, then the variable speed rotor 50 will be rotated in the reverse direction (compared to that of FIG. 8A) shown by arrow $T_r$ in FIG. 8C. Naturally, if driving shaft 56 is rotating in the direction $T_r$ shown in FIG. 8C when axial guide vanes 42" are reversed to the position shown in FIG. 8A, dynamic braking action will be imposed and continued operation of driving shaft 26 will drive driven shaft 56 in the direction indicated by the arrow $T_f$. Thus, changing the orientation position of the axial guide vanes of the various embodiments illustrated can be utilized to brake and to select the direction of rotation of the variable speed rotor 50 and thereby of driven shaft 56, without the necessity of reversing gears, clutches or other prior art expedients. Control of the axial guide vanes of any of the embodiments of the invention may be done manually or the illustrated knobs 44 on equivalent means may be operated by suitable electric controls or the like.

Figure 7A:
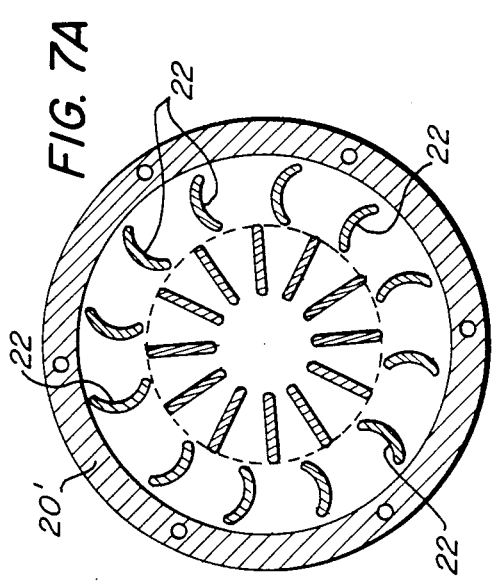
FIG. 7A is a view in elevation taken along line A—A of FIG. 7.
Figure 7:
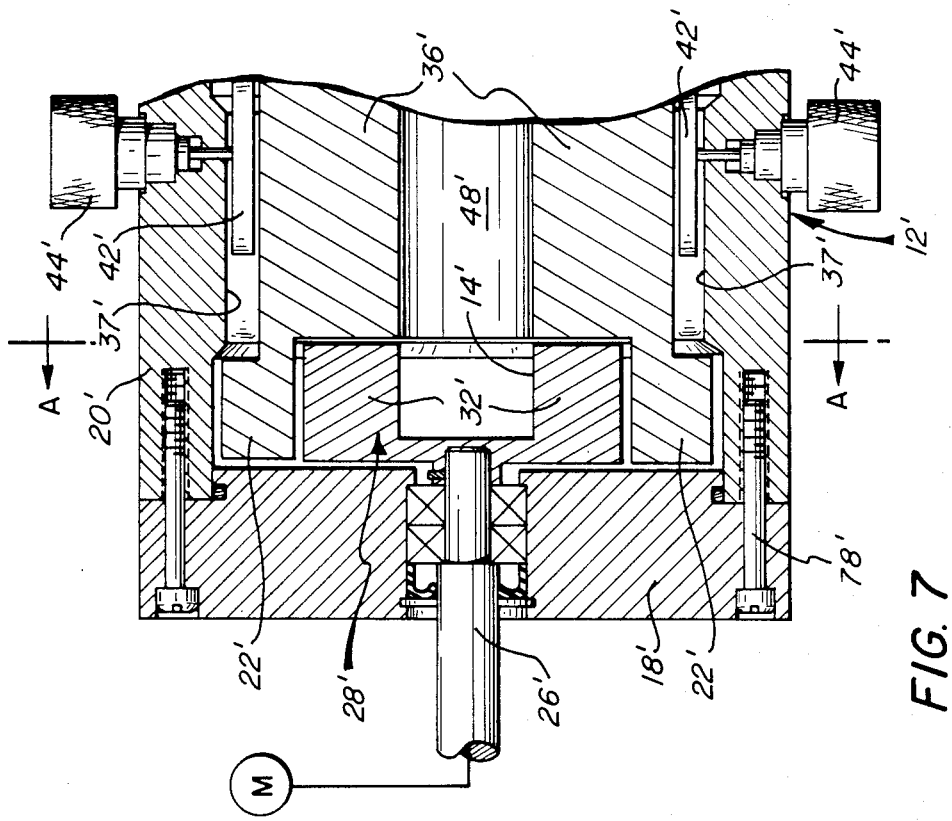
FIG. 7 is a partial schematic view corresponding to the input end of FIG. 1 (left-hand end as viewed in FIG. 1) but of an alternate embodiment of the invention.

FIG. 7 shows a partial schematic view corresponding to the input end of FIG. 1 but of another embodiment of the invention wherein a flow controller 36' has stationary guide vanes 22 formed integrally therewith. As seen in FIG. 7A, stationary guide vanes 22 may be arcuate in cross-sectional view transverse to their longitudinal axes. Flow controller 36' is thus cantilever-supported within central housing 20' with an open annular space 37 between it and the inside surface of central housing 20'. Obviously, support-spacer means (not shown) may be utilized to help retain flow controller 36' centered within central housing 20'. Axial guide vanes 42', identical or similar to those of the FIG. 1 embodiment, may be used in combination with the stationary guide vanes 22. Thus, either stationary guide vanes 22 or axial guide vanes 42' or both may comprise "flow directing means", as that term is used herein and in the claims. Similarly, reference to the flow directing means being "operatively associated" with the fluid discharge passage or passages, means that the flow directing means controls or influences the direction of the flow of fluid, e.g., hydraulic transmission fluid, from the input chamber to the output chamber.

Generally, other parts of the FIG. 7 embodiment are identical or similar in construction and function to corresponding parts of the FIG. 1 embodiment and need not be further described, save to note that they are prime-numbered to correspond to corresponding parts of the FIG. 1 embodiment.

Figure 9:
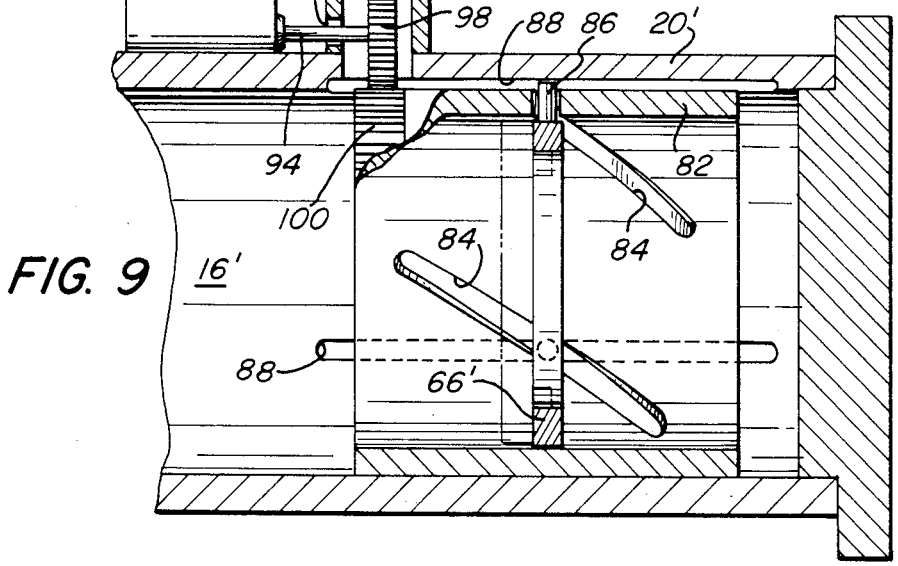
FIG. 9 is a partial schematic view corresponding to the output end of FIG. 1 (right-hand end as viewed in FIG. 1) but of a second alternate embodiment of the invention.
Figure 9A:
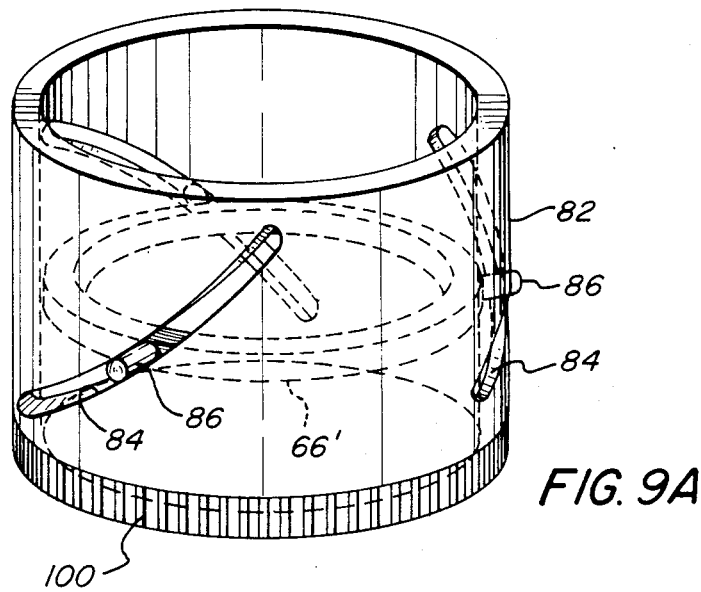
FIG. 9A is a prespective view of a positioning collar forming a part of the device illustrated in FIG. 9.
Figure 9B:
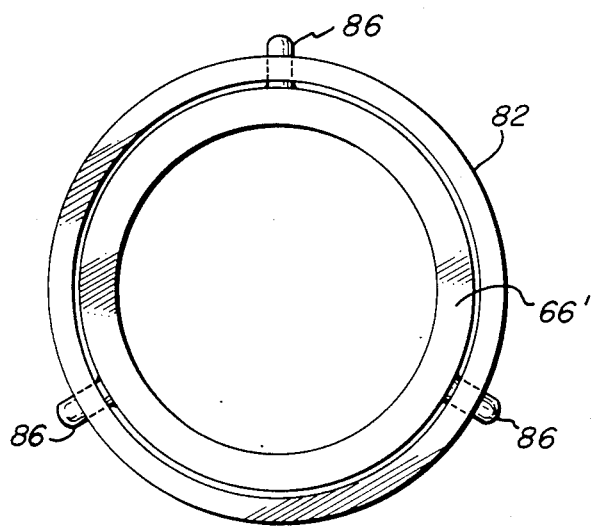
FIG. 9B is an end view of the baffle bearing ring of the FIG. 9 embodiment of the invention.

Referring now to FIG. 9, there is shown a partial schematic view corresponding to the output end of FIG. 1, but of a different embodiment in which, as mentioned above, the position of baffle bearing ring 66', and thereby of the adjustable baffle means (corresponding to 58 in FIG. 1, but omitted from FIG. 9 for clarity of illustration) is selectively set by a motor driven helical positioning collar 82. As seen with reference to FIGS. 9, 9A and 9B, helical positioning collar 82 has the shape generally of a hollow cylinder open at each opposite end and within which is formed a plurality of slots 84 helically disposed relative to the longitudinal axis of positioning collar 82. Positioning collar 82 is sized to be slidably received within central housing 20'. In this embodiment, baffle bearing ring 66' has a plurality of studs 86 (FIG. 9B) protruding radially outwardly therefrom and extending through respective ones of slots 84. The distal end of each of studs 86 is received within a corresponding keyway 88 formed on the interior wall of central housing 20' and extending parallel to the longitudinal axis thereof. In the embodiment illustrated in FIG. 9, central housing 20' has a hollow boss 90 formed thereon in which an opening (unnumbered) is provided to receive a bearing-packing 92 for the shaft 94 of a collar drive means which comprises, in the illustrated embodiment, stepping motor 96. Shaft 94 is fitted with a gear 98 which engages a suitable toothed track ring 100 (FIG. 9A). The embodiment illustrated in FIG. 9 may be similar or substantially identical to, for example, the embodiment of FIG. 1 except that stepping motor 96 and positioning collar 82 serve as a positioning means 70' in lieu of the positioning rods 72 of the FIG. 1 embodiment. In operation, in order to set baffle bearing ring 66' at a desired location within output chamber 16' of the device, controls (not shown) associated with stepping motor 96 drive the motor to turn shaft 94 the desired amount, thereby rotating positioning collar 82 a corresponding amount. As positioning collar 82 rotates slots 84 move, thereby forcing studs 86 and thereby baffle bearing ring 66' leftwardly or rightwardly as viewed in FIG. 9, depending upon the direction of rotation of gear 98 and thereby of collar 82. Thus, by selectively rotating gear 98 the desired amount in a forward or reverse direction, collar 82 may be correspondingly rotated a desired amount in a desired direction to set the position of the adjustable baffle means (not shown in FIG. 9). It will be appreciated that a baffle means, such as baffle means 58 of FIG. 1, is carried by bearing ring 66' in substantially the same manner as bearing ring 66 of FIG. 1 carries baffle means 58.

While the invention has been described in detail with reference to preferred embodiments, it will be apparent to those skilled in the art that, upon a reading and understanding of the foregoing, numerous alterations thereto may be made, which alterations are nonetheless within the spirit of the invention and the scope of the appended claims. For example, the adjustable baffle means could be arranged so that movement thereof to selectively adjust the volume of the output chamber does not affect the amount of impingement surface area provided by the rotor, i.e., the total of rotor surface area exposed to the portion of the output chamber defining a part of the fluid flow circuit. In one embodiment of this type, the adjustable baffle means could be fixed relative to the rotor blades so that they move together during re-positioning of the baffle means. In another embodiment of this type, the rotor could be mounted to one side of the output chamber and the adjustable baffle means mounted on the opposite side of the output chamber for movement towards and away from the rotor.

What is claimed is:

1. A fluid-operated transmission device comprising:
   a housing enclosing an input chamber and an output chamber, the latter having an unbaffled portion thereof provided by an adjustable baffle means movably mounted within the output chamber, the input chamber and the unbaffled portion of the output chamber being interconnected in fluid flow communication by a fluid discharge passage and a fluid return passage to define a fluid flow circuit;
   an impeller mounted for rotation within the input chamber and having input connector means dimensioned and configured for connection to a driving means for rotation of the impeller by such driving means to pump fluid through the discharge passage; and
   a variable-speed rotor mounted for rotation within the output chamber by fluid discharged from the discharge passage and having output connector means dimensioned and configured for connection to a driven means for driving thereof by the rotor, the rotor comprising a rotor impingement surface disposed in the unbaffled portion of the output chamber and defined by a plurality of rotor blades open to radial flow in the fluid flow circuit over substantially all of the impingement surface, whereby positioning of the adjustable baffle means to adjust the volume of the unbaffled portion of the output chamber adjusts the rotational speed of the rotor by varying the velocity of fluid flow in the unbaffled portion of the output chamber.

2. The device of claim 1 wherein the adjustable baffle means is movable relative to the rotor impingement surface whereby to expose a selected portion thereof to the unbaffled position of the output chamber.

3. The device of claim 2 wherein the adjustable baffle means comprises a baffle wall having one or more openings therein dimensioned and configured to receive respective rotor blades therein for sliding movement relative thereto.

4. The device of claim 1 further including a flow controller disposed within the housing between the input chamber and the output chamber, the flow controller comprising a fluid discharge passage having flow-directing means operatively associated therewith to control the direction of impingement of fluid discharged from the discharge passage onto the rotor impingement surface.

5. The device of claim 4 wherein the fluid return passage comprises a passage extending through the flow controller.

6. The device of claim 5 wherein the flow controller is of generally cylindrical configuration, the fluid discharge passage is disposed adjacent the outer circumference of the flow controller, the fluid return passage is disposed radially inwardly thereof and the impeller and rotor are mounted at respective longitudinally opposite ends of the flow controller.

7. The device of claim 4 wherein the flow-directing means are mounted for selective positioning whereby to selectively direct the angle of impingement of fluid onto the rotor impingement surface.

8. The device of claim 7 wherein at least one flow directing means is adjustable between a first drive position in which fluid is directed onto the rotor impingement surface of the variable-speed rotor to drive the rotor in a first direction, and a second drive position in which the fluid is directed onto the rotor impingement surface of the variable speed rotor to drive it in a direction opposite to the first direction.

9. The device of claim 7 wherein the flow directing means is movable between a drive position in which fluid is directed onto the rotor impingement surface of the variable-speed rotor in a direction to drive the rotor, and a braking position in which fluid is directed onto the rotor impingement surface in a direction to resist rotation thereof.

10. The device of claim 7 wherein the fluid discharge passage comprises a plurality of fluid discharge passages and the flow-directing means comprises a plurality of flow-directing means, respective ones of which are associated with respective flow discharge passages.

11. The device of claim 1 further including positioning means operatively associated with the adjustable baffle means to selectively position the latter within the output chamber.

12. The device of claim 11 wherein the positioning means comprises a positioning rod extending through the housing and having rod control means accessible from exteriorly of the housing.

13. The device of claim 11 wherein the positioning means comprises a positioning collar operatively connected to the adjustable baffle means and mounted within the housing, and further including collar drive means operatively connected to the positioning collar to rotate the positioning collar to a selected rotational position corresponding to a desired position of the adjustable baffle means.

14. The device of claim 13 wherein the positioning collar is rotatably mounted within the housing and the collar drive means comprises a stepping motor.

15. The device of claim 1 wherein the driving means and the driven means are respective shafts mounted for rotation in the housing with the impeller and rotor disposed respectively thereon in spaced-apart coaxial relationship.

16. The device of claim 15 wherein the adjustable baffle means is movable relative to the rotor impingement surface whereby to expose a selected portion of the rotor impingment surface to the output chamber portion of the fluid flow circuit.

17. The device of claim 1 further including a generally cylindrical shaped flow controller disposed between the rotor and the impeller, the fluid discharge passage defining one or more annular spaces formed between the flow controller and the housing and the fluid return passage being defined by at least one axially extending passage through the flow controller.

18. The device of claim 17 wherein the impeller comprises an impeller hub having one or more impeller blades extending therefrom, the rotor impingement surface comprises one or more rotor blades and the rotor comprises a rotor hub having one or more rotor blades extending therefrom.

19. The device of claim 18 wherein the impeller and the rotor are coaxially aligned with the fluid return passage which is defined by a bore centered on the longitudinal axis of the flow controller.

20. A method of transmitting power at selected output speeds and substantially constant output power by means of a device comprising:
   (i) a housing enclosing an input chamber and an output chamber, the latter having an unbaffled portion thereof provided by an adjustable baffle means movably mounted therein, the input chamber and the unbaffled portion of the output chamber being interconnected in fluid flow communication by a fluid discharge passage and a fluid return passage to define a fluid flow circuit, positioning of the adjustable baffle means within the output chamber serving to selectively adjust the volume of the unbaffled portion of the output chamber;

(ii) an impeller mounted for rotation within the input chamber and having input connector means dimensioned and configured for connection to a driving means for rotation of the impeller by the driving means to pump fluid through the discharge passage; and (iii) a variable-speed rotor mounted for rotation within the output chamber by fluid discharged from the discharge passage and having output connector means dimensioned and configured for connection to a driven means for driving thereof by the rotor, the rotor comprising a rotor impingement surface disposed in the unbaffled portion of the output chamber and defined by a plurality of rotor blades open to radial flow in the fluid flow circuit over substantially all of the impingement surface, whereby positioning of the adjustable baffle means to adjust the volume of the unbaffled portion of the output chamber adjusts the rotational speed of the rotor by varying the velocity of the fluid flow in the unbaffled portion of the output chamber; the method comprising the steps of:

(a) transmitting power from a motive source to the impeller to rotate the latter to pump fluid through the fluid flow circuit; and (b) selectively adjusting the volume of the unbaffled portion of the output chamber whereby the speed of movement of the pumped fluid through the output chamber, and thereby the rotational speed of the rotor, is selectively adjusted.

21. The methof of claim 20 wherein the device further includes flow-directing means operatively associated with the fluid discharge passage and further including the step of (c) controlling the angle of impingement of fluid discharged from the fluid discharge passage onto the impingement surface of the rotor.

22. The method of claim 21 including changing the angle of impingement of fluid discharged from the fluid discharge passage onto the impingement surface of the rotor whereby to reverse the direction of rotation of the rotor.

23. The method of claim 21 including changing the angle of impingement of fluid discharged from the fluid discharge passage onto the impingement surface of the rotor whereby to brake the rotor by offering resistance to the rotation thereof.

* * * * *

UNITED STATES PATENT AND TRADEMARK OFFICE
CERTIFICATE OF CORRECTION

PATENT NO. : 4,672,810

DATED : Jun. 16, 1987

INVENTOR(S) : Christian P. Marlowe

It is certified that error appears in the above—identified patent and that said Letters Patent is hereby corrected as shown below:

Column 1, line 28, replace "2,999,569" with --2,999,400--

Column 14, line 11, in the first line of claim 21 replace "methof" with --method--

Signed and Sealed this

Tenth Day of November, 1987

Attest:

DONALD J. QUIGG

Attesting Officer

Commissioner of Patents and Trademarks